United States Patent
McBride et al.

(10) Patent No.: US 10,084,669 B2
(45) Date of Patent: Sep. 25, 2018

(54) SYSTEM AND METHOD FOR CLOUD COMPUTING ADAPTIVE CLOUD SERVICES

(71) Applicant: CenturyLink Intellectual Property LLC, Denver, CO (US)

(72) Inventors: Kevin M. McBride, Lone Tree, CO (US); Felipe Castro, Erie, CO (US); Steven M. Casey, Littleton, CO (US); Thomas Schwengler, Lakewood, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 267 days.

(21) Appl. No.: 14/527,604

(22) Filed: Oct. 29, 2014

(65) Prior Publication Data

US 2015/0295760 A1    Oct. 15, 2015

Related U.S. Application Data

(60) Provisional application No. 61/977,284, filed on Apr. 9, 2014.

(51) Int. Cl.
*H04L 12/24* (2006.01)
*H04L 12/66* (2006.01)

(52) U.S. Cl.
CPC ...... *H04L 41/5051* (2013.01); *H04L 41/0843* (2013.01); *H04L 41/5096* (2013.01)

(58) Field of Classification Search
CPC ............................. H04L 41/0806; H04L 12/66
See application file for complete search history.

(56) References Cited

U.S. PATENT DOCUMENTS

| 8,495,611 B2 | 7/2013 | McCarthy |
| 9,258,237 B1 | 2/2016 | Smith et al. |

(Continued)

FOREIGN PATENT DOCUMENTS

| KR | 10-2012-0051382 A | 5/2015 |
| WO | WO-2015/175223 | 11/2015 |

OTHER PUBLICATIONS

International App. No. PCT/US2015/028330; International Search Report and Written Opinion dated Jul. 20, 2015; 10 pages.

(Continued)

*Primary Examiner* — Charles C Jiang
*Assistant Examiner* — Thad Defauw
(74) *Attorney, Agent, or Firm* — Swanson & Bratschun, L.L.C.

(57) ABSTRACT

Novel tools and techniques are provided for remotely configuring and orchestrating multifunctional cloud devices located on customer premises, in some cases, using a smart cloud adaptive device. In some embodiments, the smart cloud adaptive device, which might have one or more wireless programmable radios configured to communicate with a network termination device, might communicate with a cloud configuration server over a network via the one or more wireless programmable radios (and, in some embodiments, through the network termination device). The smart cloud adaptive device might transmit device identification information associated with a customer and/or service codes indicative of services to be provided to the customer. The smart cloud adaptive device might receive one or more configuration files from the cloud configuration server based on the service codes, and enable functionality among a plurality of functionalities to provision the services, based on the one or more configuration files.

20 Claims, 5 Drawing Sheets

(56) References Cited

U.S. PATENT DOCUMENTS

| | | | |
|---|---|---|---|
| 9,471,349 B1 | 10/2016 | Stone et al. | |
| 9,680,836 B2 | 6/2017 | White | |
| 2002/0049803 A1 | 4/2002 | Bandhole et al. | |
| 2005/0060551 A1* | 3/2005 | Barchi | H04L 63/08 |
| | | | 713/182 |
| 2009/0099940 A1 | 4/2009 | Frederick et al. | |
| 2009/0304060 A1* | 12/2009 | Schenk | H04B 3/32 |
| | | | 375/224 |
| 2010/0332262 A1 | 12/2010 | Horvitz et al. | |
| 2010/0332684 A1 | 12/2010 | Selitser et al. | |
| 2011/0016214 A1 | 1/2011 | Jackson | |
| 2011/0096728 A1 | 4/2011 | Wu et al. | |
| 2011/0145094 A1 | 6/2011 | Dawson et al. | |
| 2011/0153806 A1 | 6/2011 | Bagasra | |
| 2011/0283017 A1 | 11/2011 | Alkhatib et al. | |
| 2012/0117565 A1 | 5/2012 | Staelin et al. | |
| 2012/0131232 A1 | 5/2012 | Brownlow et al. | |
| 2012/0131579 A1 | 5/2012 | Pujolle | |
| 2012/0179538 A1 | 7/2012 | Hines et al. | |
| 2012/0316676 A1* | 12/2012 | Fouillade | B25J 11/0005 |
| | | | 700/246 |
| 2012/0324061 A1 | 12/2012 | Parsons | |
| 2013/0031028 A1* | 1/2013 | Martin | G06Q 30/08 |
| | | | 705/400 |
| 2013/0035869 A1* | 2/2013 | Minges | G01N 1/2226 |
| | | | 702/24 |
| 2013/0058339 A1 | 3/2013 | Casado | |
| 2013/0067090 A1 | 3/2013 | Batrouni et al. | |
| 2013/0303884 A1* | 11/2013 | Kuntz | G06T 11/006 |
| | | | 600/417 |
| 2014/0074647 A1 | 3/2014 | Mukherjee et al. | |
| 2014/0108792 A1 | 4/2014 | Borzycki et al. | |
| 2014/0181267 A1 | 6/2014 | Wadkins et al. | |
| 2014/0200840 A1* | 7/2014 | Cox | G01D 21/02 |
| | | | 702/104 |
| 2014/0227976 A1 | 8/2014 | Callaghan | |
| 2014/0229945 A1 | 8/2014 | Barkai | |
| 2014/0279201 A1 | 9/2014 | Iyoob | |
| 2014/0280964 A1 | 9/2014 | Farooq et al. | |
| 2014/0280978 A1 | 9/2014 | Martinez | |
| 2014/0324647 A1 | 10/2014 | Iyoob | |
| 2014/0365662 A1 | 12/2014 | Dave | |
| 2015/0012763 A1 | 1/2015 | Cohen | |
| 2015/0012977 A1* | 1/2015 | Huh | G06F 9/468 |
| | | | 726/4 |
| 2015/0039737 A1* | 2/2015 | Smith | H04L 67/2814 |
| | | | 709/222 |
| 2015/0067171 A1 | 3/2015 | Yum | |
| 2015/0071271 A1* | 3/2015 | Smedman | H04W 48/18 |
| | | | 370/338 |
| 2015/0095936 A1* | 4/2015 | Yu | H04N 21/6125 |
| | | | 725/28 |
| 2015/0113142 A1* | 4/2015 | Adolph | H04L 47/70 |
| | | | 709/226 |
| 2015/0206207 A1 | 7/2015 | Marashimhan | |
| 2015/0222723 A1 | 8/2015 | Adapalli | |
| 2015/0332351 A1 | 11/2015 | McBride et al. | |
| 2015/0332357 A1 | 11/2015 | McBride et al. | |
| 2015/0333979 A1 | 11/2015 | Schwengler et al. | |
| 2015/0341230 A1 | 11/2015 | Dave | |
| 2015/0341240 A1 | 11/2015 | Iyoob | |
| 2016/0019636 A1 | 1/2016 | Adapalli | |
| 2016/0065417 A1 | 3/2016 | Sapuram | |
| 2016/0132214 A1 | 5/2016 | Koushik | |

OTHER PUBLICATIONS

U.S. Appl. No. 14/562,097; Non-Final Rejection dated Jun. 29, 2016; 21 pages.

U.S. Appl. No. 14/562,088; Non-Final Rejection dated Aug. 4, 2016; 35 pages.

Group Specification 'ETSI GS NFV 001-004 V1.1.1' (Oct. 2013) to ETSI, 98 pages.

OpenFlow paper 'FlowVisor: A Network Virtualization Layer' (Oct. 14, 2009) to Sherwood et al., 15 pages.

International App. No. PCT/US2015/028330; International Preliminary Report on Patentability dated Dec. 1, 2016; 7 pages.

U.S. Appl. No. 14/562,088; Final Rejection dated Jan. 6, 2017; 44 pages.

U.S. Appl. No. 14/562,097; Final Rejection dated Nov. 7, 2016; 18 pages.

U.S. Appl. No. 14/562,076; Non-Final Rejection dated Jun. 2, 2017; 37 pages.

U.S. Appl. No. 14/562,097; Non-Final Rejection dated Mar. 8, 2017; 21 pages.

U.S. Appl. No. 14/562,097; Final Rejection dated Jul. 5, 2017; 20 pages.

U.S. Appl. No. 14/562,088; Non-Final Rejection dated Jul. 26, 2017; 46 pages.

European Patent Application No. 15792885.4; Extended European Search Report dated Oct. 23, 2017; 9 pages.

Zhou, H., et al., "Virtual Network Function Configuration Architecture," dated Sep. 23, 2013, 9 pages.

* cited by examiner

SYSTEM AND METHOD FOR CLOUD COMPUTING ADAPTIVE CLOUD SERVICES

CROSS-REFERENCES TO RELATED APPLICATIONS

This application claims priority to U.S. Provisional Patent Application Ser. No. 61/977,284, filed Apr. 9, 2014, by Kevin M. McBride et al., entitled, "Cloud Computing Adaptive Cloud Services," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to cloud networking devices, and more particularly to methods, systems, and computer software for configuring and orchestrating multifunctional cloud devices located on customer premises.

BACKGROUND

Provisioning Internet, television, and telephone services to residential and commercial customers traditionally requires a service provider to configure and provide equipment such as set-top boxes ("STBs"), modems, voice over Internet protocol ("VoIP") adapters, and other gateway devices. Oftentimes, these devices require the customer or a technician to install and configure them on customer premises.

Conventional gateway devices come with pre-loaded firmware or otherwise with some other pre-loaded configuration by the service provider or manufacturer. Once installed, the devices' functions are limited so as to only be practicably used in their purpose-specific capacity as a residential or commercial gateway device. As a result, the gateway devices have limited upgradability, and in many situations, cannot be used between different service providers or to receive different types of services. This forces the customer to use multiple fixed-function service devices to receive upgraded or additional services, or alternatively for the customer to replace older equipment altogether.

Furthermore, as consumer devices increasingly become interconnected over "the Internet of Things," these "smart" devices often require additional fixed-function devices or components to enable their smart functionality. For example, smart devices can include any device (which may have smart functionality incorporated therein), including, but not limited to, health monitoring devices such as heart monitoring implants, appliances, utility meters, automobiles, thermostats, alarms and sensors, power plugs and sockets, and home and commercial security systems. Each of these devices utilizes different applications and/or interfaces for communication and also relies on different communications protocols.

Hence, there is a need for an adaptive solution to configuring and provisioning services via gateway devices, while also expanding the capability and functionality of gateway devices beyond their fixed-function implementations. In particular, a system is needed for automatically configuring a gateway device capable of activating multiple services using different technologies on different service provider networks.

BRIEF SUMMARY

According to a set of embodiments, a smart cloud adaptive device is provided that allows for remote configuring or orchestrating, by a service provider over a network, of multifunctional capabilities and functionalities on the smart cloud adaptive device (which is located at a customer premises).

In some embodiments, a smart cloud adaptive device configured to communicate with a cloud configuration server over a service provider network is provided. The smart cloud adaptive device may include one or more wireless programmable radios for establishing communications with a network termination device. The smart cloud adaptive device transmits device identification information associated with a customer and/or associated with one or more service codes. The one or more service codes indicate one or more services to be provided to the customer. In response, the smart cloud adaptive device receives one or more configuration files from the cloud configuration server based on the one or more service codes. Various hardware and services are enabled among a plurality of functionalities to provision the one or more services based on the one or more configuration files.

According to another set of embodiments, a system for configuring a smart cloud adaptive device is provided. The system includes, but is not limited to, a cloud server, network termination device, and an adaptive cloud device. The cloud configuration server hosts a plurality of configuration files, each of which are associated with a respective service code. The network termination device includes, without limitation, devices such as a digital subscriber line access multiplexer, a cable modem termination system, or an optical line termination that connects a customer premises to a service provider network, and in turn the cloud configuration server.

The adaptive cloud device might communicate with the network termination device using one or more wireless programmable radios. The adaptive cloud device might, in some cases, communicate with the cloud configuration server over the service provider network via the one or more wireless programmable radios. In some embodiments, the wireless programmable radios may communicate with the cloud configuration server via the network termination device.

The smart cloud adaptive device transmits device identification information associated with a customer to the cloud configuration server. The device identification information is further associated with one or more service codes that indicate one or more services to be provided to the customer at the customer premises. The smart cloud adaptive device receives one or more configuration files from the cloud configuration server based on the one or more service codes. The smart cloud adaptive device then enables hardware and other functionality needed to provision the one or more services based on the one or more configuration files.

A further set of embodiments provides a method of configuring and providing services with a smart cloud adaptive device. The method includes, communicating, via the smart cloud adaptive device, with a cloud configuration server. Device identification information is transmitted via the smart cloud adaptive device, wherein the identification information is further associated with one or more service codes. The one or more service codes indicate one or more services to be provided to the customer. One or more configuration files are received from the cloud configuration server by the smart cloud adaptive device. The configuration files are sent based on the one or more service codes. Hardware and other functionality are enabled on the smart cloud adaptive device based on the one or more configuration files.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a smart cloud adaptive device might comprise at least one processor, one or more wireless programmable radios configured to communicate with a network termination device, and a non-transitory computer readable medium. The non-transitory computer readable medium might have encoded thereon computer software comprising a set of instructions that, when executed by the at least one processor, causes the smart cloud adaptive device to perform one or more operations. The set of instructions might comprise instructions for communicating with a cloud configuration server over a network via the one or more wireless programmable radios and through the network termination device. The set of instructions might also comprise instructions for transmitting device identification information associated with a customer and/or associated with one or more service codes. The one or more service codes might indicate one or more services to be provided to the customer. The set of instructions might further comprise instructions for receiving one or more configuration files from the cloud configuration server based on the one or more service codes and instructions for enabling functionality among a plurality of functionalities to provision the one or more services based on the one or more configuration files.

In some embodiments, the functionality might include one or more of residential gateway functionality, wireless access point functionality, set-top box functionality, Internet protocol telephony, sensory device functionality, wireless tomography, and/or the like. According to some embodiments, instructions for enabling functionality among a plurality of functionalities to provision the one or more services might comprise instructions for enabling functionality among a plurality of functionalities to provision at least two services simultaneously, based on the at least one configuration file.

Merely by way of example, in some cases, the smart cloud adaptive device might further comprise a housing and an interface port. The housing might be configured to plug into an existing power outlet for obtaining power, while the interface port might be configured to allow other user devices to receive the one or more services.

Another aspect might provide a method for adaptively configuring and providing services with a smart cloud adaptive device. The method might comprise communicating, by a smart cloud adaptive device, with a cloud configuration server. The method might also comprise transmitting, with the smart cloud adaptive device, device identification information associated with a customer. The device identification information might be further associated with one or more service codes. The one or more service codes might indicate one or more services to be provided to the customer. The method might further comprise receiving, with the smart cloud adaptive device, one or more configuration files from the cloud configuration server based on the one or more service codes, and enabling, with the smart cloud adaptive device, functionality among a plurality of functionalities to provision the one or more services based on the one or more configuration files.

In some cases, the functionality might include one or more of residential gateway functionality, wireless access point functionality, set-top box functionality, Internet protocol telephony, sensory device functionality, wireless tomography, and/or the like.

According to yet another aspect, a system for configuring a smart cloud adaptive device might be provided. The system might comprise a cloud configuration server, a network termination device, and an adaptive cloud device. The cloud configuration server might comprise a plurality of configuration files, each being associated with a respective service code. The network termination device might connect a customer premises to the cloud configuration server. The adaptive cloud device might comprise at least one processor, one or more wireless programmable radios configured to communicate with the network termination device, and a non-transitory computer readable medium. The non-transitory computer readable medium might have encoded thereon computer software, which might comprise a set of instructions that, when executed by the at least one processor, causes the adaptive cloud device to perform one or more operations.

The set of instructions might comprise instructions for communicating with the cloud configuration server over a network via the one or more wireless programmable radios. The one or more wireless programmable radios may communicate with the cloud configuration server via the network termination device. The set of instructions might also comprise instructions for transmitting device identification information associated with a customer to the cloud configuration server. The device identification information might be further associated with one or more service codes. The one or more service codes might indicate one or more services to be provided to the customer at the customer premises. The set of instructions might also comprise instructions for receiving one or more configuration files from the cloud configuration server based on the one or more service codes. The set of instructions might further comprise instructions for enabling hardware and other functionality among a plurality of functionalities to provision the one or more services based on the one or more configuration files.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
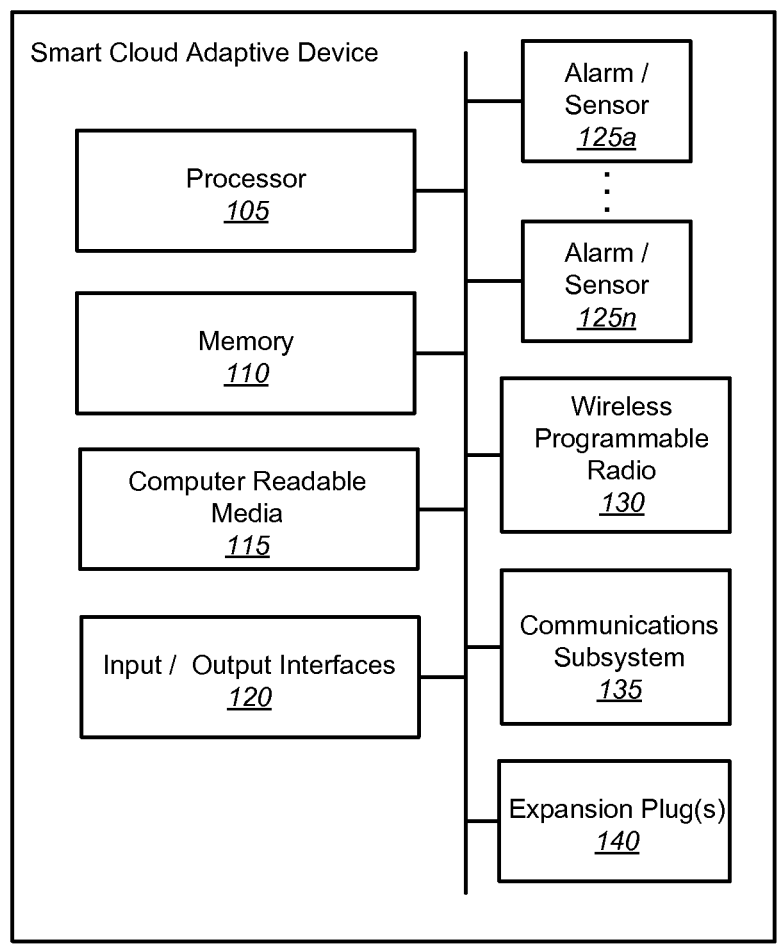
FIG. 1 is a hardware block diagram of a smart cloud adaptive device, according to various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide tools and techniques for implementing a smart cloud adaptive device. In particular, the various embodiments provide for a smart cloud adaptive device configured to communicate with a cloud configuration server over a service provider network. The smart cloud adaptive device may include one or more wireless programmable radios for establishing communications with a network termination device. The smart cloud adaptive device, in some embodiments, might transmit device identification information associated with a customer and/or associated with one or more service codes. The one or more service codes indicate one or more services to be provided to the customer. The smart cloud adaptive device might receive one or more configuration files from the cloud configuration server based on the one or more service codes. Various hardware and services are enabled among a plurality of functionalities to provision the one or more services based on the one or more configuration files.

FIGS. 1-5 illustrate a smart cloud adaptive device and a method and system for configuring and providing service to the smart cloud adaptive device. FIGS. 1-5 may refer to examples of different embodiments that include various components and steps, which can be considered alternatives or which can be used in conjunction with one another in the various embodiments. Furthermore, the accompanying descriptions of FIGS. 1-5 are provided for purposes of illustration and should not be considered to limit the scope of the different embodiments.

FIG. 1 is a hardware block diagram illustrating a smart cloud adaptive device 100, in accordance with various embodiments. The smart cloud adaptive device 100 comprises a processor 105, memory 110, computer readable media 115, input/output interfaces 120, a plurality of alarms and sensors 125a-125n (collectively, 125), a wireless programmable radio 130, and/or communications subsystem 135.

Input/output interfaces 120 include any ports, connectors, and communication protocols and standards that may be used by the smart cloud adaptive device 100 and/or any user devices connected to the smart cloud adaptive device 100, to send and receive data related to a service needed by the user devices, or otherwise for the user devices and smart cloud adaptive device 100 to communicate with each other and/or other devices. Input/output interfaces 120 may include, but are not limited to, connectivity over Ethernet ports, universal serial bus ("USB") ports, coaxial connector ports, RCA connector ports, high-definition multimedia interface ("HDMI") ports, digital visual interface ("DVI") ports, DisplayPort ("DP") ports, video graphics array ("VGA") connector ports, optical fiber connector ports, phone connector jacks, standard telephone plugs or jacks, or any suitable interfaces capable of transferring audio, video, and/or data signals.

The smart cloud adaptive device 100 also comprises a communications subsystem 135. The communications subsystem 135 may include or form part of one or more of the I/O interfaces 120. The communications subsystem 135 can also include, without limitation, a modem, a network card (wireless or wired), an infra-red communication device, a wireless communication device and/or chipset (such as a Bluetooth™ device, an 802.11 device, a WiFi device, a WiMax device, a wireless wide area network ("WWAN") device, a long-term evolution ("LTE") device, etc.), and/or the like. The communications subsystem 135 permits data to be exchanged with a local or wide area network, or with any connected user devices.

The plurality of alarms and/or sensors 125 allow the smart cloud adaptive device to take measurements of the surrounding environment, as well as to alert users, set off an alarm, or otherwise notify users of certain conditions. For example, sensors in alarm/sensor 125 can include, but are not limited to, smoke detectors, carbon monoxide detectors, digital cameras, video recorders, motion detectors, noise detectors, and/or radio frequency ("RF")/acoustic/optical tomography devices, or the like. The sensors of alarm/sensor 125 may be configured, monitored, or operated by a service provider, or sensor information may be communicated to a service provider or a user device via communications subsystem 135 or input/output interfaces 120. In some embodiments, sensor information may be directly processed within the smart cloud adaptive device 100 by processor 105.

Alarms in alarm/sensor 125 may include, but are not limited to, audible, visual, or other forms of alarms that alert a customer to a specific condition based on the sensor information, or information from a user device connected to the smart cloud adaptive device 100 via input/output interfaces 120 or communications subsystem 135.

A wireless programmable radio 130 is provided in smart cloud adaptive device 100 configured to wirelessly communicate with one or more cloud configuration servers of at least one service provider. The wireless programmable radio 130 may be a software defined radio ("SDR"), or other programmable radio capable of establishing communications with the cloud configuration servers of each of the at least one service provider in a multicast and/or broadcast fashion simultaneously, or by establishing a connection individually with each of the at least one service provider. The wireless programmable radio 130 may establish a connection to a service provider controlled network termination device, including, but not limited to, a cellular network base station, a digital subscriber line access multiplexer ("DSLAM"), cable modem termination system, optical line termination ("OLT"), a wireless node in a distributed antenna system ("DAS"), or other service provider controlled remote terminal or network device at a central office ("CO") or headend. Connections may be established by the wireless programmable radio 130 over WiFi, WiMax, 3G or 4G (such as LTE), or other suitable connections having an effective range to reach the various network termination devices. The wireless programmable radio 130 may connect to a specific network termination device, multiple network termination devices, or a set of network termination devices, based on pre-loaded firmware or other code that initializes the wireless programmable radio 130 upon startup. In yet other embodiments, the wireless programmable radios 130 may be pre-configured to operate only with one or more specific service provider's network termination devices.

In some embodiments, the smart cloud adaptive device 100 can be plugged directly into and can receive power from a standard alternating current ("AC") power plug/wall socket. In other embodiments, the smart cloud adaptive device 100 may be powered by an external power supply or adapter. In yet other embodiments, the smart cloud adaptive device 100 may be integrated into a power strip, or at the end of an extension cord. In each such embodiments, the smart cloud adaptive device 100 may also include one or more expansion plugs 140 so that other devices can still be connected to the power plug/wall socket. In some further embodiments, the smart cloud adaptive device 100 may also include a backup battery or other backup power supply to ensure continued operation in the event of a power outage or a power fluctuation.

Once powered, the wireless programmable radio 130 establishes a connection with a network termination device. For example, a wireless connection may be established in a broadcast, multicast, or unicast fashion with multiple service providers. The wireless connection may utilize any of a WiFi, 3G, 4G or other wireless data connection. The wireless programmable radio 130 is able to communicate with a cloud configuration server via the network termination device. The wireless programmable radio 130 transmits device identification information to a cloud configuration server. The identification information may be unique to the particular smart cloud adaptive device 100, or may identify a customer associated with the smart cloud adaptive device. The device identification information may include a MAC address, a gateway IP address, a customer identification number, a customer account number, service codes, or other information that identifies a customer or the services to be provided to the smart cloud adaptive device 100.

The cloud configuration server is able to push a configuration file(s) to the wireless programmable radio 130 based on the device identification information. Thus, images of various customer premise equipment having virtualized architectures can be pushed to and executed by the smart cloud adaptive device 100. Thus, an image of the customer premise equipment can be sent to the smart cloud adaptive device 100 as the configuration file(s). In such embodiments, the smart cloud adaptive device functions as a host machine managing one or more "guest" virtual machines. Thus, when loaded with a configuration file, the smart cloud adaptive device can act as any of the one or more "guest" virtual machines providing connectivity with user devices via the various input/output interfaces 120 or communications subsystems 135.

For example, according to one set of embodiments, the wireless programmable radio 130 may establish a connection to a local or neighborhood DSLAM. In some embodiments, the DSLAM may act as a cloud configuration server and may host the configuration file(s). In other embodiments, the DSLAM may allow the wireless programmable radio 130 to communicate with a cloud configuration server via a provider network associated with the DSLAM. The wireless programmable radio 130 may connect to a specific service provider's DSLAM, or other network termination device, based on pre-loaded firmware or other code indicating how to initialize the wireless programmable radio 130. In yet other embodiments, the wireless programmable radio 130 may connect to and receive multiple service offerings from more than one service provider and provide the customer with an option to choose between various service providers via a portal or dedicated webpage. In some embodiments, the network termination device of a single Internet, television, and/or telephone service provider may push a service offering portal to the smart cloud adaptive device. The service offering portal may present service offerings from other affiliated service providers. For example, various home/commercial security service providers, video service providers, Internet service providers, and telephone service providers may be presented from the portal. In other embodiments, the service offering portal may present a plurality of different Internet, video, telephone, security, and other service providers for selection by the user. Once the user selects the desired service provider, the wireless programmable radio 130 may be configured to establish a connection to the network termination device of the selected service provider, or may otherwise reach a cloud configuration server of the selected service provider. Localized service offerings may be retrieved from the network termination device or cloud configuration server, or preloaded service offerings may be presented automatically by the smart cloud adaptive device before a connection is established. The service offerings may include, but are not limited to, a description of the various services, tiers of services, service packages, and the price/rates charged for the corresponding services.

The wireless programmable radio 130 then receives a configuration file via the selected or otherwise connected to DSLAM, that, when run by the processor 105, causes the smart cloud adaptive device to function as a wireless gateway. Thus, the smart cloud adaptive device 100 may connect to the DSLAM via a digital subscriber line ("DSL") input/output interface 120 and start receiving service. Communications subsystem 135 may then provide WiFi connectivity to user devices within range to receive DSL Internet service. In some further embodiments, the input/output interfaces 120 may also include Ethernet ports to provide wired connectivity for user devices. Thus, once powered on, the smart cloud adaptive device 100 automatically configures itself as a wireless residential gateway.

According to another set of embodiments, the smart cloud adaptive device 100 may configure itself as a soft STB. If Internet service is already provided by a separate gateway device, the smart cloud adaptive device 100 can connect to the Internet wirelessly or through a wired connection (via the input/output interfaces 120) to the separate gateway device. If Internet service is already activated to the household, the smart cloud adaptive device 100 may itself connect to the Internet or wide area network ("WAN") via the service provider's DSL or cable line. Otherwise, if no Internet service is requested or available at the time, the wireless programmable radio 130 may establish a connection to a network termination device as described above with respect to configuring Internet service via the DSLAM.

Upon connection to the Internet or network termination device, communication is established with a cloud configuration server. Device identification information is transmitted to the cloud configuration server. The cloud configuration server determines whether to activate or provide offers for television/video service to the smart cloud adaptive device, based on the device identification information. The wireless programmable radio 130 may connect to a specific service provider's network termination device or to a specific service provider's cloud configuration servers over the Internet, based on pre-loaded firmware or other code indicating how to initialize the wireless programmable radio 130. In yet other embodiments, the smart cloud adaptive device 100 may connect to and receive multiple service offerings from more than one service provider and provide the customer with an option to choose between various service providers via the Internet or via various network termination devices.

The smart cloud adaptive device 100 then receives a configuration file via the wireless programmable radio 130 or communications subsystem 135, based on the selection of the user. The configuration file, when run by the processor 105, causes the smart cloud adaptive device to function as a soft STB. Television/video service may be activated at either the smart adaptive device 100 (based on the configuration file) or cloud configuration server (based on the device identification information). Thus, the smart cloud adaptive device 100 automatically configures itself as an STB upon being connected at a customer premise.

Once configured, various user devices are able to connect to input/output interfaces 120 to receive television/video services. In such embodiments, input/output interfaces 120 are capable of delivering video and/or audio information. Such input/output interfaces 120 include, without limitation, HDMI ports, IEEE 1394 (also known as Firewire) ports, a coaxial RF television connection ports, a display port interface ports, component video/RCA connection ports, optical audio ports, and other such interfaces. Once user devices are connected to the smart cloud adaptive device 100 via the input/output interfaces 120, and based on the configuration file loaded onto the smart cloud adaptive device 100, the processor may cause the user device to display a specific user interface such as an electronic programming guide, and/or service provider specific programming.

The smart cloud adaptive device 100, as described above, may be configured to function as both a wireless residential gateway and STB simultaneously. In additional embodiments, the smart cloud adaptive device 100 may be further configured to simultaneously function as an additional gateway device, such as a VoIP adapter. In other embodiments, multiple smart cloud adaptive devices 100 may be utilized in different parts of the customer premises with each smart cloud adaptive device 100 being configured to provide different functions or different sets of functionality.

In some embodiments, multiple smart cloud adaptive devices 100 may be interconnected with one another to provide a single service. For example, according to one set of embodiments, one or more smart cloud adaptive devices 100 may be deployed as part of a security system. Each of the one or more smart cloud adaptive devices 100 may be distributed around the premises. For example, in one embodiment, smart cloud adaptive devices 100 may be implemented as part of a shopping mall security system. A plurality of smart cloud adaptive devices 100 may be distributed around a shopping mall to provide coverage of the desired areas of the shopping mall. According to one set of embodiments, each of the plurality of smart cloud adaptive devices 100 may be individually connected to a service provider network. In another set of embodiments, one or a set of the smart cloud adaptive devices 100 may be connected to a service provider network, thus each acting as a gateway/routing device to which all other smart cloud adaptive devices 100 are connected. In other sets of embodiments, each of the plurality of smart cloud adaptive devices 100 may be coupled to separate gateway/routing devices. The plurality of smart cloud adaptive devices 100 may communicate wirelessly or via a wired connection.

Each of the smart cloud adaptive devices 100 are provisioned with alarms/sensors 125 that include sound pressure sensor capable of detecting ambient atmospheric pressure levels caused by sound waves. In one embodiment, the sound pressure sensors 125 are configured to report or otherwise report sound readings above a threshold. In this case, the threshold is a pre-determined sound pressure level ("SPL"), measured in decibels (dB), corresponding to, for example, gunshots or explosions, or the like. For example, in some embodiments, the threshold for the sound pressure sensors may be set to 140 dB. If the sound pressure sensor 125 detects a noise reaching or exceeding the 140 dB threshold level, the smart cloud adaptive device 100 will report the event appropriately. For example, in some embodiments, the smart cloud adaptive device 100 may relay the information to the provider of the security services over a network connection. In other embodiments, the smart cloud adaptive device 100 may be configured to directly alert government law enforcement agencies and police departments as configured by the user or the configuration file used during initialization. In some embodiments, the alarm/sensor 125 may also include auditory and visual alerts that are triggered when the 140 dB threshold is exceeded. In further embodiments, the alarm sensor 125 may include colored lights, including, without limitation, light emitting diodes that indicate to shopping mall patrons whether to proceed or move away from a particular area or direction.

In a home or residential setting, a plurality of smart cloud adaptive devices 100 may be deployed to monitor a broad area in or around the home, or be limited to a single room. In one set of embodiments, the smart cloud adaptive device 100 may include sensors/alarms 125 that include a tomographic device. The tomographic device may be configured to create a tomographic mapping of the area surrounding the sensor 125. In some embodiments, the configuration file may cause the wireless programmable radio 130 or communications subsystem 135 to comprise part of the sensor 125. For example, an RF radio may be employed to create a tomographic mapping of the interior of a room. In other embodiments, acoustic or optical tomographic devices may be employed. Thus, the sensor 125 may be configured to detect changes in its physical surroundings using such tomographic techniques. Sensors 125 may also further include digital cameras (such as infrared cameras), video recorders, thermometers, motion detectors, and noise detectors that may be combined with each other using sensor fusion techniques to provide a home security solution. Thus, the sensors 125 may be used to monitor doors, windows, and other entrances, as well as changes to its physical surroundings, such as furniture placement and the detection of objects around the room. Upon the detection of a triggering condition, such as a break-in, the plurality smart cloud adaptive devices 100 may be interconnected and may report such events as described above with respect to the shopping mall security implementation.

It is to be understood that functionality and operation of sensor 125 as described in each of the above contexts or embodiments may be interchanged or combined as desired. For example, in some embodiments, sensors 125 may include both sound pressure sensors and a tomographic device so that both sound pressure level and tomographic monitoring can be provided.

In the context of home automation, smart cloud adaptive devices 100 may include expansion plugs 140 or multiple expansion plugs 140 as part of an integrated power strip, according to one set of embodiments. Once plugged into an existing power plug or socket, the smart cloud adaptive device 100 may be loaded with a configuration file to smartly manage whether and how to provide power to devices plugged into smart cloud adaptive device 100. In some embodiments, the smart cloud adaptive device 100 may detect whether a user device is in an idle or sleep state and remove power to that user device accordingly. In other embodiments, the smart cloud adaptive device 100 may provide power usage measurements in real-time or process power usage measurements for further processing. In other embodiments, the power to specific user devices or expansion ports 140 may be selectively turned on or off based upon user rules, or as provided in a configuration file(s).

According to another set of embodiments, the smart cloud adaptive device 100 may further be configured to operate as a utility meter, or may be in communication directly with a separate smart utility meter via communications subsystem 135 such that the separate smart utility meter does not require an Internet connection or other network connection for communication. The smart cloud adaptive device 100 may also be configured to operate various user devices such as televisions, gaming consoles, media players, and/or set-top boxes; heating, ventilation, and air conditioning ("HVAC") systems; home appliances; security cameras and sensors; sprinkler systems; lighting systems; among others. Thus, the smart cloud adaptive device 100 may act as a home entertainment system; thermostat; appliance control system and utility meter; security system; gardening control system; lighting control system; and/or the like. Sensors 125 are provided and operated as needed to provide such functionality. In some embodiments, the smart cloud adaptive device 100 may include a display and/or controls for controlling such features. In other embodiments, control over these features may be accessible via a display connected to an input/output interface 120, or as a menu/user interface accessible by the customer utilizing the smart cloud adaptive device 100 as an STB. In further embodiments, a webpage or portal may be provided to allow the customer to control the home automation features.

In yet another set of embodiments, the smart cloud adaptive device may also be used in conjunction with health monitoring user devices, including, without limitation, a heart rate monitor, an oximeter, blood pressure sensor, and a blood glucose meter, among others. In such cases, the communications subsystem 135, sensors 125, and/or wireless programmable radio 130 may be in communication with the health monitoring device. For example, the health monitoring user device may utilize various communication standards that include, without limitation, near-field communication ("NFC"), Bluetooth™, or WiFi, and the like. Thus, the smart cloud adaptive device 100 may receive a configuration file(s) that allows communication with the health monitoring device using the appropriate communication standard. For example, heart rate monitoring information may be transmitted to the smart cloud adaptive device in real-time over a Bluetooth™ connection. If a heart rate above or below a certain threshold is detected, the smart cloud adaptive device may contact emergency medical services and/or alert a specific service provider to the condition. In some embodiments, the smart cloud adaptive device 100 may communicate the event via a network connection provided by communications subsystem 135. In other embodiments, the smart cloud adaptive device 100 may establish direct communication to a service provider node or emergency services via wireless programmable radio 130.

It is to be understood that in each of the embodiments, gateway, security, home automation, health monitoring, and other user device functionality are provided by way of illustration only. In other embodiments, the above described functionality may be switched, combined, or added to other services and functionality as required by the customer or service provider.

Figure 2:
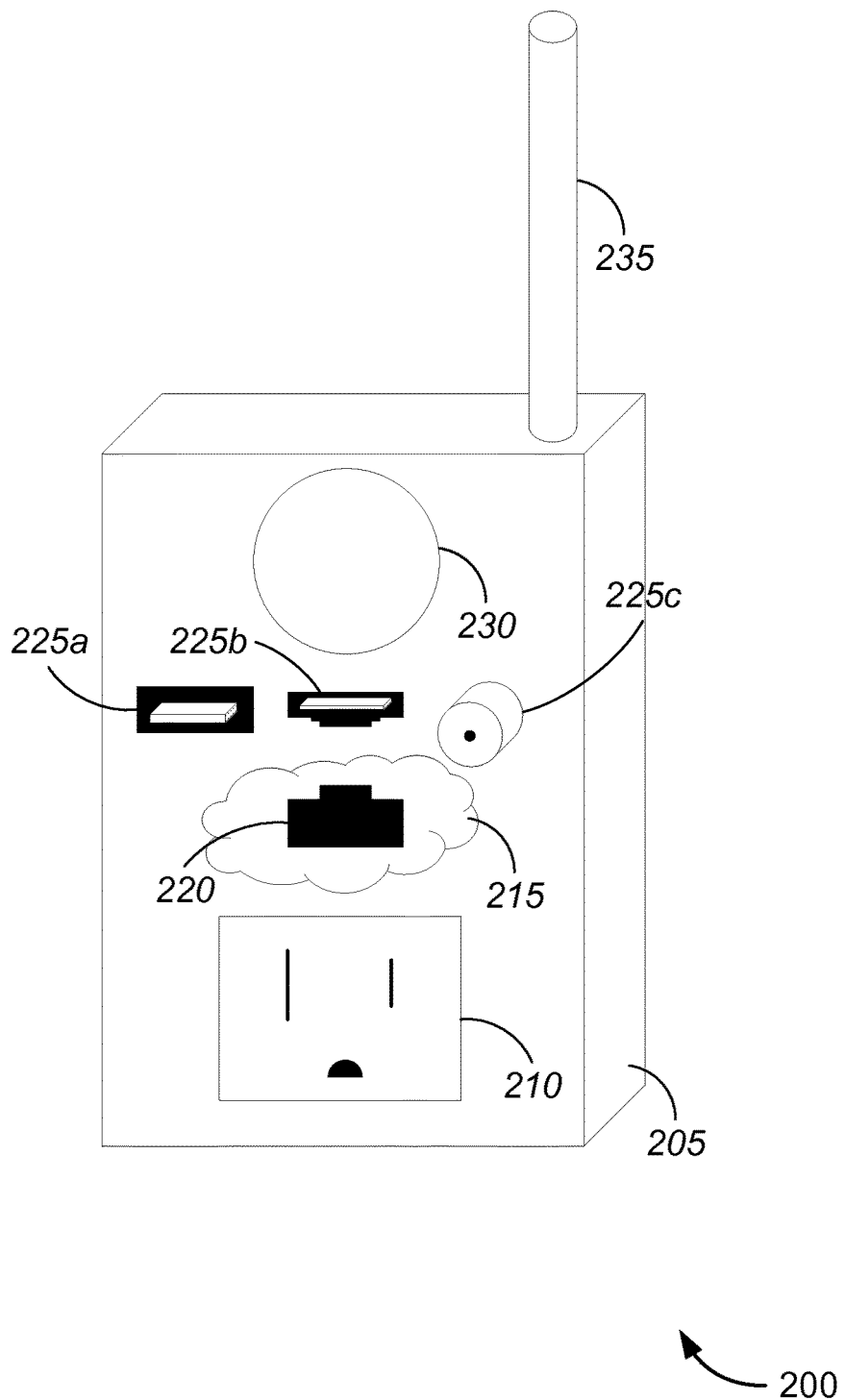
FIG. 2 is a perspective view of a smart cloud adaptive device, according to various embodiments.

FIG. 2 illustrates a perspective view of the smart cloud adaptive device 200, according to various embodiments. Smart cloud adaptive device 200 of the embodiment shown in FIG. 2 includes, without limitation, housing 205; expansion socket 210; communication port(s) 215 (which may be utilized by the communications subsystem 135 and/or as part of the input/output interfaces 120, or the like), with the communication port(s) 215 having an Ethernet port 220; various input/output interface ports 225a-225c (225 collectively) in the form of a USB port 225a, HDMI port 225b, and coaxial plug 225c; sensors and/or alarms 230; and an RF antenna 235; or the like. The smart cloud adaptive device 200 may also include a power plug or socket on the backside (not shown) of the housing 205 for receiving power, and (in some cases) various other plugs or socket as well, such as additional Ethernet ports, telephone line inputs, television inputs, etc., for providing the various services and related functions. In some instances, only the power plug or socket is provided, with data, voice, video signals, and/or the like being communicated via the RF antenna 235. In some embodiments, instead of (or in addition to) the power plug or socket, a battery, a set of batteries, or the like may be utilized.

In FIG. 2, housing 205 is depicted as a rectangular box around the size of a standard wall power socket. However, as described above with respect to FIG. 1, in some embodiments, the housing 205 may be of other shapes and/or may take different form factors, such as a power strip, or in some instances may be integrated directly into the walls of a commercial premises. In some embodiments, the smart cloud adaptive device 200 may be plugged directly into a wall power socket. In other embodiments, the smart cloud adaptive device 200 may be positioned away from a wall power socket, for example hung on a wall of the customer premises or attached to the ceiling. As such, it is to be understood the form factor of the housing 205 does not in any way limit the positioning and/or operation of the smart cloud adaptive device 200 and is not limited in any way to the form factors described above.

The housing 205 protects and houses the internal components of the smart cloud adaptive device 200, such as the processor 105, system memory 110, computer readable media 115, underlying hardware of the input/output interfaces 120 and communications subsystem 135, sensors and alarms 125, 230, and the receiver, transmitter, and/or transceiver for the wireless programmable radio 130 (e.g., antenna 235), or the like.

The antenna 235 receives feed signals from the radio transmitter of the wireless programmable radio 130 and/or the communications subsystem 135. The antenna 235 is depicted as an external antenna for the sake of simplicity. It is to be understood the antenna 235 may comprise multiple antennas having multiple different structures, and is not to be limited in any way to the depicted external structure. For example, the antenna may be housed internally, integrated into housing 205, and/or formed on a printed circuit board ("PCB") of the various components. Any antenna design, known to those in the art, and capable of use with wireless programmable radios 120 may be utilized in conjunction with the smart cloud adaptive device 200 including, but not limited to, various microstrip/patch antennas, or the like.

Each of the input/output ports 225 may be used for either incoming or outgoing communications, and may also comprise part of the communications subsystem 135 and/or wireless programmable radio 130. The depicted input/output ports 225 are provided by way of example only, and are not to be understood as limiting the input/output ports 225 in number or by type to the above described embodiments. Furthermore, even though one expansion socket 210 is depicted with respect to FIG. 2, it is to be understood that in other embodiments, multiple expansion sockets 210 may be provided and is in no way limited to the number of expansion sockets 210 in the embodiments described above.

Figure 3:
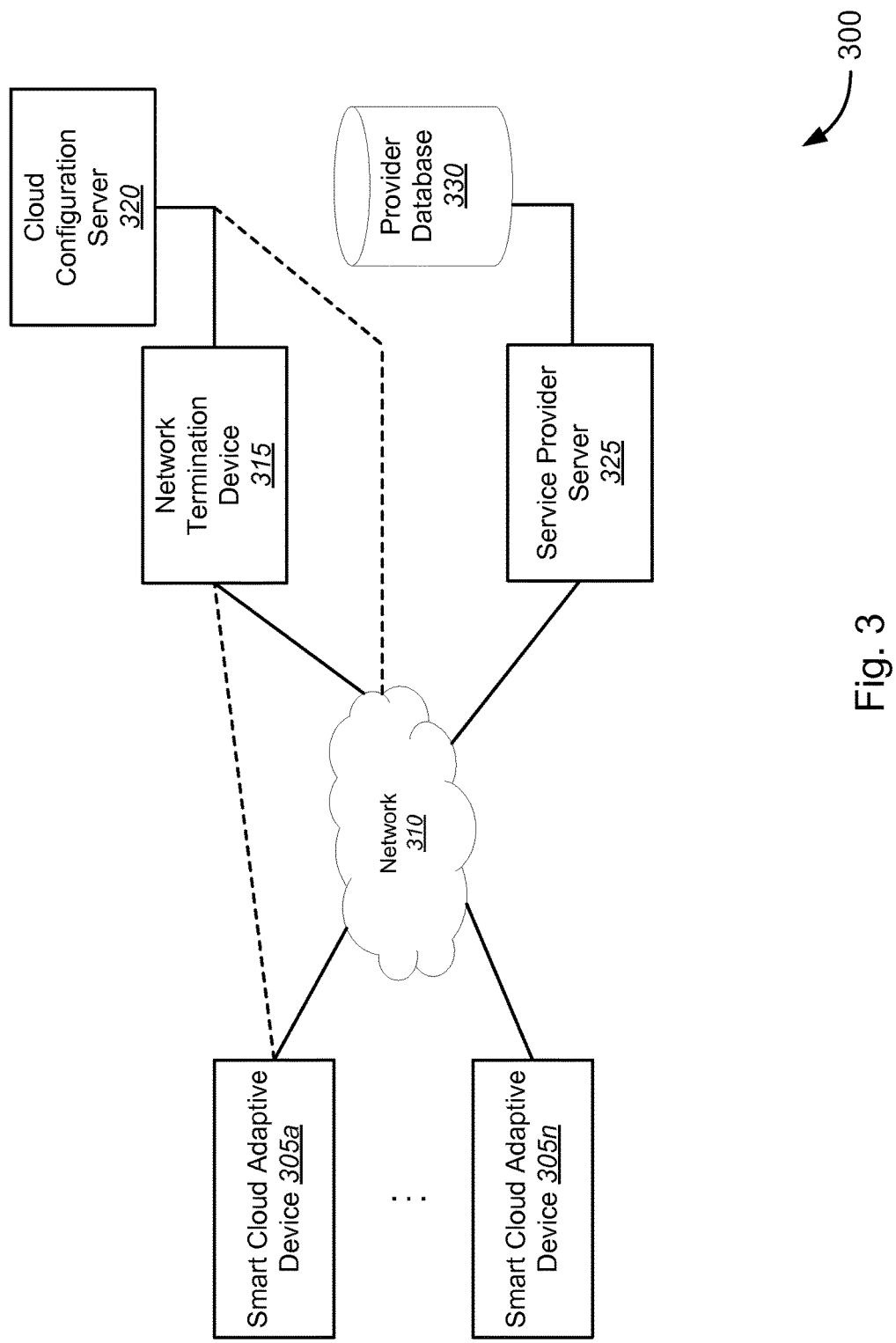
FIG. 3 is a network block diagram of the back end of a system for configuring and providing services to a smart cloud adaptive device, in accordance with various embodiments.

FIG. 3 illustrates a network block diagram of a back end system 300 for configuring and providing services to a smart cloud adaptive device, in accordance with various embodiments. A plurality of smart cloud adaptive devices 305a-305n (305 collectively) are coupled to a network termination device 315. Cloud adaptive device 305a may directly connect to network termination device 315 that is in range of its wireless programmable radio 130. In other embodiments, the smart cloud adaptive device may establish a connection to a network termination device 315 via a local network comprising part of network 310. Smart cloud adaptive device 305n may not be able to directly communicate with network termination device 315 and must connect to a cloud configuration server 320 over the Internet or other wide area network comprised by network 310. In yet other embodiments, smart cloud adaptive device 305n may connect to the network termination device 315 via the Internet or other wide area network of network 310.

Network termination device 315 includes local, geographically limited, service provider controlled remote terminals or network devices located at a service provider central office. Such network termination devices can include, without limitation, one or more of a cellular network base station, a digital subscriber line access multiplexer ("DSLAM"), cable modem termination system, optical line termination ("OLT"), and/or a wireless node in a distributed antenna system ("DAS"). In one set of embodiments, the network termination device 315 communicates, or allows the smart cloud adaptive devices 305 to communicate, with cloud configuration server 320 to identify the smart cloud adaptive device 305 and provide configuration files from the cloud configuration server to the smart cloud adaptive device 305. In an alternative set of embodiments, the cloud configuration server 320 may be integrated with the network termination device 315 such that network termination device 315 may configure or provide configuration files for smart cloud adaptive devices 305. The cloud configuration server 320 may be configured to receive smart cloud adaptive device identification information and may provide configuration files based on the device identification information and service codes that indicate what services to configure for each of the respective smart cloud adaptive devices 305a-305n.

FIG. 3 depicts a single network termination device 315, cloud configuration server 320, service provider server 325, and provider database 330 by way of example only. In other embodiments, multiple network termination devices 315, cloud configuration servers 320, service provider servers 325, and provider databases 330 may be used. Accordingly, in some embodiments, the smart cloud adaptive devices 305 may be pre-programmed to communicate with one or more specific network termination devices 315 from one or more specific service providers, or to one or more specific cloud configuration servers 320. In other embodiments, the smart cloud adaptive devices 305 may communicate to one or more specific network termination devices 315 or cloud configuration servers 320 based on user selections of services and/or service providers.

Once configured with a configuration file, the smart cloud adaptive devices 305 are able to start providing services and to communicate with the service provider server 325 over the Internet or other wide area network 310. Provider database 330 may store service information, such as service tiers and packages associated with a respective smart cloud adaptive device 305a-305n.

Figure 4:
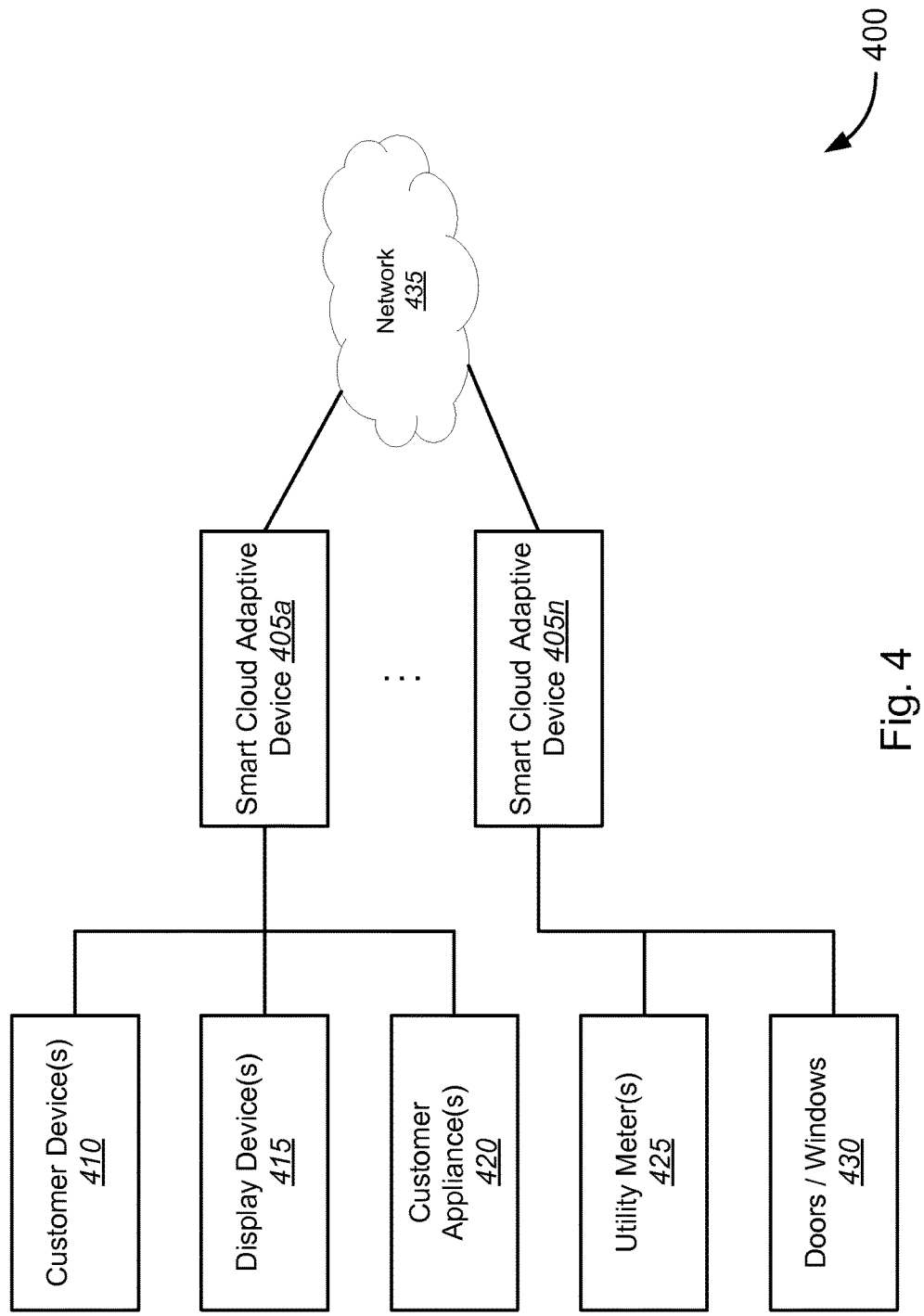
FIG. 4 is a network block diagram of the client side of a system for configuring and providing services to a smart cloud adaptive device, in accordance with various embodiments.

FIG. 4 is a network block diagram of the client side of the smart cloud adaptive device system 400. Coupled to smart cloud adaptive devices 405a-405n (collectively, 405) are a variety of user devices 410-430. According to one set of embodiments, the smart cloud adaptive devices 405a through 405n may be a part of the same customer premises, with each of the smart cloud adaptive devices 405a through 405n being configured to provide one or more different services. In another embodiment, smart cloud adaptive device 405a through smart cloud adaptive device 405n may be implemented in different customer premises and/or for different customers. In some embodiments, the smart cloud adaptive devices 405 may be connected to one or more user devices, or alternatively, to no user devices. The smart cloud adaptive devices 405 may also provide one or more services to each of the one or more user devices. The network 435 may comprise a local area network, a wide area network, the Internet, a cloud-based network, a service provider network, or any other network which may be accessed by the wireless programmable radio or communications subsystem of the smart cloud adaptive devices 405. Thus, it is to be understood that the arrangement depicted in FIG. 4 is for illustrative purposes only and is in no way intended to limit the scope of the embodiments.

In FIG. 4, customer devices 410, display devices 415, and customer appliances 420 are shown connected to smart cloud adaptive device 405a. Customer devices 410, display devices 415, and customer appliances 420 may additionally receive power from power sockets in the smart cloud adaptive device 405a. Customer device 410 may include any consumer or user devices, including, without limitation, consumer electronics, handheld devices, smartphones, tablets, personal computers, health monitoring devices, lights and fixtures, and/or other like devices that may be electronically controlled or may communicate electronically. In various embodiments, the smart cloud adaptive device 405a may act as a gateway device allowing the customer devices to access a wide area network 435, like the Internet. In other embodiments, the smart cloud adaptive device 405a may function as a local area network ("LAN") router so that connected consumer devices 410 may communicate to other devices on the LAN 435. In yet further embodiments, the smart cloud adaptive device 405a may act as a wireless hotspot allowing consumer devices to access the Internet through a mobile broadband network using a protocol such as 4G LTE or the like. Alternatively, the smart cloud adaptive device 405a may forward information over 435 to a service provider server via network 435 for processing by a service provider.

Display devices 415 may include any device capable of displaying visual content as provided by the smart cloud adaptive device 405a. Such devices may include, without limitation, televisions, various monitors and displays, and/or integrated screens on the smart cloud adaptive device 405a, or the like. In these embodiments, the smart cloud adaptive device 405a may be configured to function as a set-top box or other device for receiving/providing video content and services. For example, in various embodiments, the smart cloud adaptive device 405a may be configured to receive television service. Television service may be initialized and/or authorized based on the configuration file(s) received by the smart cloud adaptive device 405a and/or device identification information associated with the smart cloud adaptive device 405a. Video content may be received via network 435 or over a cable or satellite connection to the smart cloud adaptive device, depending on the type of video service and service provider selected by the customer using the smart cloud adaptive device 405a. In other embodiments, the smart cloud adaptive device 405a may provide a user interface, webpage or portal on a display device for a customer to make configuration and service selections on the smart cloud adaptive device 405a.

Customer appliances 420 may include any appliances on the customer premises that may be automated or controlled electronically via the smart cloud adaptive device 405a. Customer appliances 420 may include, without limitation, smart refrigerators, smart HVAC systems, smart washers, smart driers, and/or smart dishwashers, or the like. The appliances may be controlled remotely through a portal or webpage provided by the smart cloud adaptive device 405a, or the customer appliances may communicate with, or access the Internet, via the smart cloud adaptive device so that a customer may remotely control the customer appliances 420 via an Internet portal provided by a separate service provider.

Smart cloud adaptive device 405n may be connected to utility meters 425 and may also be configured to monitor doors/windows 430 via its sensors. Utility meters 425 may include electricity, gas, and/or water meters. The smart cloud adaptive device 405n may be configured to control and/or monitor the usage of specific utilities by different devices, or according to a set schedule. Smart cloud adaptive device 405n may include one or more sensors, such as a tomographic device as described above, cameras, heat sensors, and/or motion detectors, or the like to monitor entrances to a customer premises such as doors and windows 430. In this role, the smart cloud adaptive device 405n may function as a security system, as described above with respect to FIG. 1.

Figure 5:
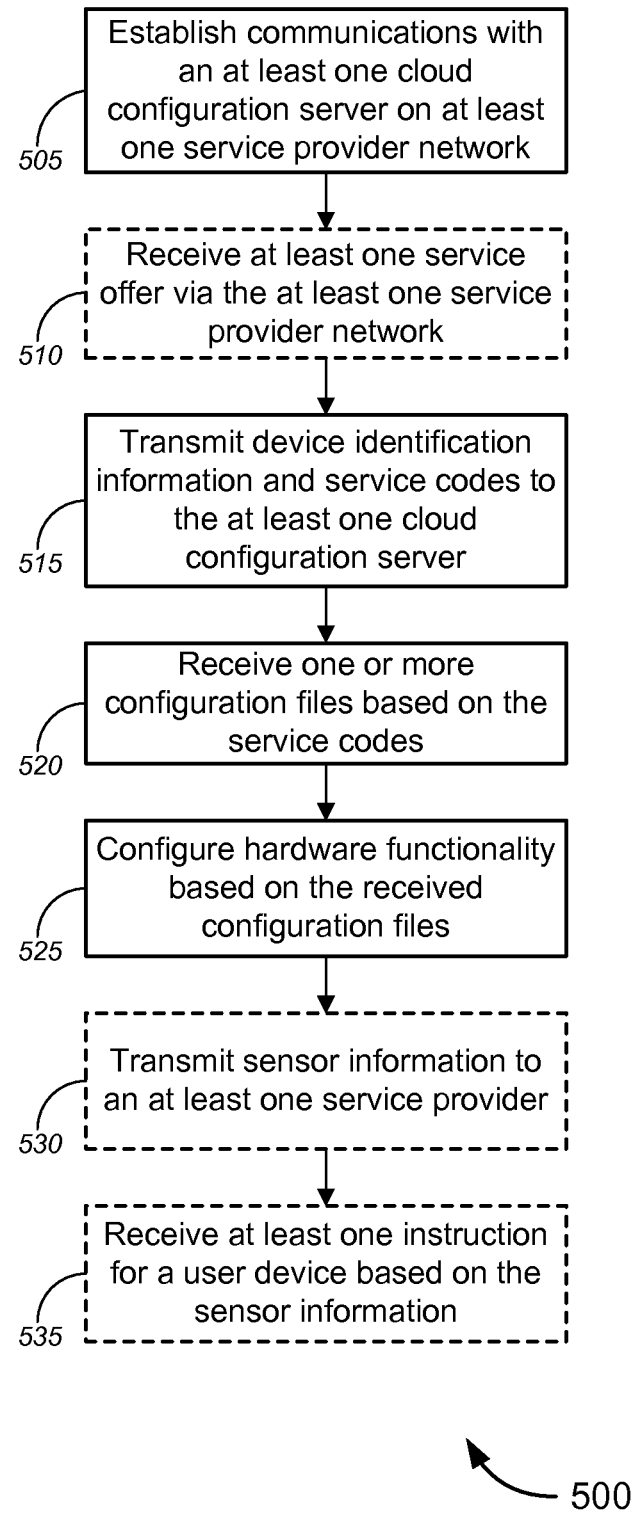
FIG. 5 is a flow chart for a process of configuring and providing services to a smart cloud adaptive device, in accordance with various embodiments.

FIG. 5 illustrates a method 500 for configuring and providing services with a smart cloud adaptive device, according to various embodiments. At block 505, the smart cloud adaptive device communicates with an at least one cloud configuration server. As described above, the smart cloud adaptive device establishes a connection to the at least one cloud configuration server directly or via a network termination device. In one embodiment, the smart cloud adaptive device may also be pre-configured to establish connections to one or more network specific termination devices or cloud configuration servers as determined by the service provider and/or vendor. In yet another embodiment, the smart cloud adaptive device may establish communications with cloud servers or network termination devices according to customer selections as received by the smart cloud adaptive device.

At optional block 510, at least one service offer may be received by the smart cloud adaptive device over the connection to the at least one service provider network. The at least one service offer may be transmitted by a network termination device or cloud configuration server. One or more of the at least one service offer may be accepted by the customer and provisioned accordingly to the smart cloud adaptive device, as will be described in more detail below.

At block 515, the smart cloud adaptive device transmits device identification information and/or service codes to the at least one cloud configuration server. The identification information uniquely identifies a smart cloud adaptive device or a set of smart cloud adaptive devices. For example, in one set of embodiments, the identification information may uniquely identify a particular smart cloud adaptive device of a plurality of smart cloud devices. In other embodiments, the identification information may identify all smart cloud devices deployed at particular customer premises, a particular area of a customer premises, or all smart cloud devices associated with a customer across multiple customer premises. In further embodiments, the device identification information may identify any combination of the above.

According to some embodiments, service codes may identify the services to be provisioned to the particular smart cloud adaptive device or set of smart cloud adaptive devices. Service codes may be pre-loaded onto the smart cloud adaptive devices, or may be transmitted based upon customer selections for services to be provided. Service codes may be unique to each of a plurality of smart cloud adaptive devices, or may be transmitted by all or a set of the plurality of smart cloud adaptive devices to receive a service. In some embodiments, the device identification information may include or otherwise indicate service codes, while in other embodiments, the device identification information and service codes may be separately transmitted.

At block 520, the smart cloud adaptive device receives one or more configuration files from the at least one cloud configuration server based on the service codes and/or device identification information. The configuration file is an image of one or more customer premise equipment having a virtualized architecture that can be pushed to, and executed by, the smart cloud adaptive device. Thus, an image of the customer premise equipment corresponding to the one or more services indicated by the service code and/or device identification information is sent to the smart cloud adaptive device in the configuration file.

At block 525, hardware functionality of the smart cloud adaptive device is configured based on the received configuration files. Thus, the smart cloud adaptive device functions as a host machine managing one or more guest virtual machines. When loaded with a configuration file, the smart cloud adaptive device can act as any of the one or more guest virtual machines providing connectivity with user devices via the various input/output interfaces or communications subsystems, and utilizing the smart cloud adaptive device's one or more sensors and alarms.

At optional block 530, sensor information from the smart cloud device's one or more sensors and alarms may be transmitted by the smart cloud adaptive device to an at least one service provider as part of receiving a service. The sensor information may be transmitted directly to a network termination device of the service provider via its wireless programmable radio, or over the Internet or other network via either the wireless programmable radio or communications subsystem.

At optional block 535, at least one instruction for a user device or customer device in communication with the smart cloud adaptive device may be received by the smart cloud adaptive device, based on the sensor information. The smart cloud adaptive device may then forward the at least one instruction to the user device via one or more of an input/output interface, communications subsystem, or wireless programmable radio through which the use device is connected to the smart cloud adaptive device.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A smart cloud adaptive device comprising:
at least one processor;
one or more wireless programmable radios configured to communicate with a network termination device;
a non-transitory computer readable medium having encoded thereon computer software comprising a set of instructions that, when executed by the at least one processor, causes the smart cloud adaptive device to perform one or more operations, the set of instructions comprising:
instructions for communicating with a cloud configuration server over a network via the one or more wireless programmable radios and through the network termination device;
instructions for transmitting, from the smart cloud adaptive device located at a customer premises, device identification information associated with a customer, wherein the device identification information is further associated with one or more service codes, the one or more service codes indicating one or more services to be provided to the customer;
instructions for receiving, with the smart cloud adaptive device located at the customer premises, one or more configuration files from the cloud configuration server based on the one or more service codes; and
instructions for enabling, on the smart cloud adaptive device located at the customer premises, hardware and functionality, which are hardware and functionality associated with a dedicated device, among a plurality of hardware and functionalities to provision the one or more services based on the one or more configuration files, wherein, once the hardware and functionality are enabled, the smart cloud adaptive device located at the customer premises reconfigures to perform the enabled functionality,
wherein the smart cloud adaptive device is a physical hardware device located at the customer premises, and wherein the smart cloud adaptive device is unassociated with the dedicated device until the hardware and functionality are enabled, on the smart cloud adaptive device.

2. The smart cloud adaptive device of claim 1, wherein the functionality includes residential gateway functionality.

3. The smart cloud adaptive device of claim 1, wherein the functionality includes wireless access point functionality.

4. The smart cloud adaptive device of claim 1, wherein the functionality includes set-top box functionality.

5. The smart cloud adaptive device of claim 1, wherein the functionality includes Internet protocol telephony.

6. The smart cloud adaptive device of claim 1, wherein the functionality includes sensory device functionality.

7. The smart cloud adaptive device of claim 1, wherein the functionality includes wireless tomography.

8. The smart cloud adaptive device of claim 1, wherein instructions for enabling functionality among a plurality of functionalities to provision the one or more services comprise instructions for enabling functionality among a plurality of functionalities to provision at least two services simultaneously, based on the at least one configuration file.

9. The smart cloud adaptive device of claim 1, further comprising:
a housing, the housing being configured to plug into an existing power outlet for obtaining power; and
an interface port, the interface port being configured to allow other user devices to receive the one or more services.

10. A method of adaptively configuring customer premises equipment, the method comprising:
communicating, via a smart cloud adaptive device located at the customer premises, with a cloud configuration server, wherein the smart cloud adaptive device is a physical hardware device located at the customer premises;
transmitting, with the smart cloud adaptive device located at the customer premises, device identification information associated with a customer, wherein the device identification information is further associated with one or more service codes, the one or more service codes indicating one or more services to be provided to the customer;
receiving, with the smart cloud adaptive device located at the customer premises, one or more configuration files from the cloud configuration server based on the one or more service codes; and
enabling, on the smart cloud adaptive device located at the customer premises, hardware and functionality, which are hardware and functionality associated with a dedicated device, among a plurality of hardware and functionalities to provision the one or more services based on the one or more configuration files, wherein, once the hardware and functionality are enabled, the smart cloud adaptive device located at the customer premises reconfigures to perform the enabled functionality, and wherein the smart cloud adaptive device is unassociated with the dedicated device until the hardware and functionality are enabled, on the smart cloud adaptive device.

11. The method of claim 10, wherein the functionality includes residential gateway functionality.

12. The method of claim 10, wherein the functionality includes wireless access point functionality.

13. The method of claim 10, wherein the functionality includes set-top box functionality.

14. The method of claim 10, wherein the functionality includes Internet protocol telephony.

15. The method of claim 10, wherein the functionality includes sensory device functionality.

16. The method of claim 10, wherein the functionality includes wireless tomography.

17. A system for configuring a smart cloud adaptive device, the system comprising:
a cloud configuration server comprising a plurality of configuration files, each of the plurality of configuration files being associated with a respective service code;
a network termination device connecting a customer premises to the cloud configuration server;
a smart cloud adaptive device, wherein the smart cloud adaptive device is a physical hardware device located at the customer premises, comprising:
at least one processor;
one or more wireless programmable radios configured to communicate with the network termination device;
a non-transitory computer readable medium having encoded thereon computer software comprising a set of instructions that, when executed by the at least one processor, causes the smart cloud adaptive device to perform one or more operations, the set of instructions comprising:
instructions for communicating with the cloud configuration server over a network via the one or more wireless programmable radios and via the network termination device;
instructions for transmitting, from the smart cloud adaptive device located at the customer premises, device identification information associated with a customer, wherein the device identification information is further associated with one or more service codes, the one or more service codes indicating the one or more services to be provided to the customer at the customer premises;
instructions for receiving, with the smart cloud adaptive device located at the customer premises, one or more configuration files from the cloud configuration server based on the one or more service codes; and
instructions for enabling, on the smart cloud adaptive device located at the customer premises, hardware and functionality, which are hardware and functionality associated with a dedicated device, among a plurality of hardware and functionalities to provision the one or more services based on the one or more configuration files, wherein, once the hardware and functionality are enabled, the smart cloud adaptive device located at the customer premises reconfigures to perform the enabled functionality, and wherein the smart cloud adaptive device is a generic device unassociated with the dedicated device until the hardware and functionality are enabled, on the smart cloud adaptive device.

18. The system of claim 17, wherein the network termination device is a digital subscriber line access multiplexer located in a central office.

19. The system of claim 17, wherein the one or more wireless programmable radios are configured to communicate with the network termination device via a residential gateway.

20. The system of claim 17, wherein the smart cloud adaptive device further comprises:
a housing, the housing being configured to plug into existing home power outlets for obtaining power; and
an interface port, the interface port being configured to allow other user devices to receive the one or more services.

* * * * *